INVENTOR
FERDINAND J. DUMANOWSKI
BY

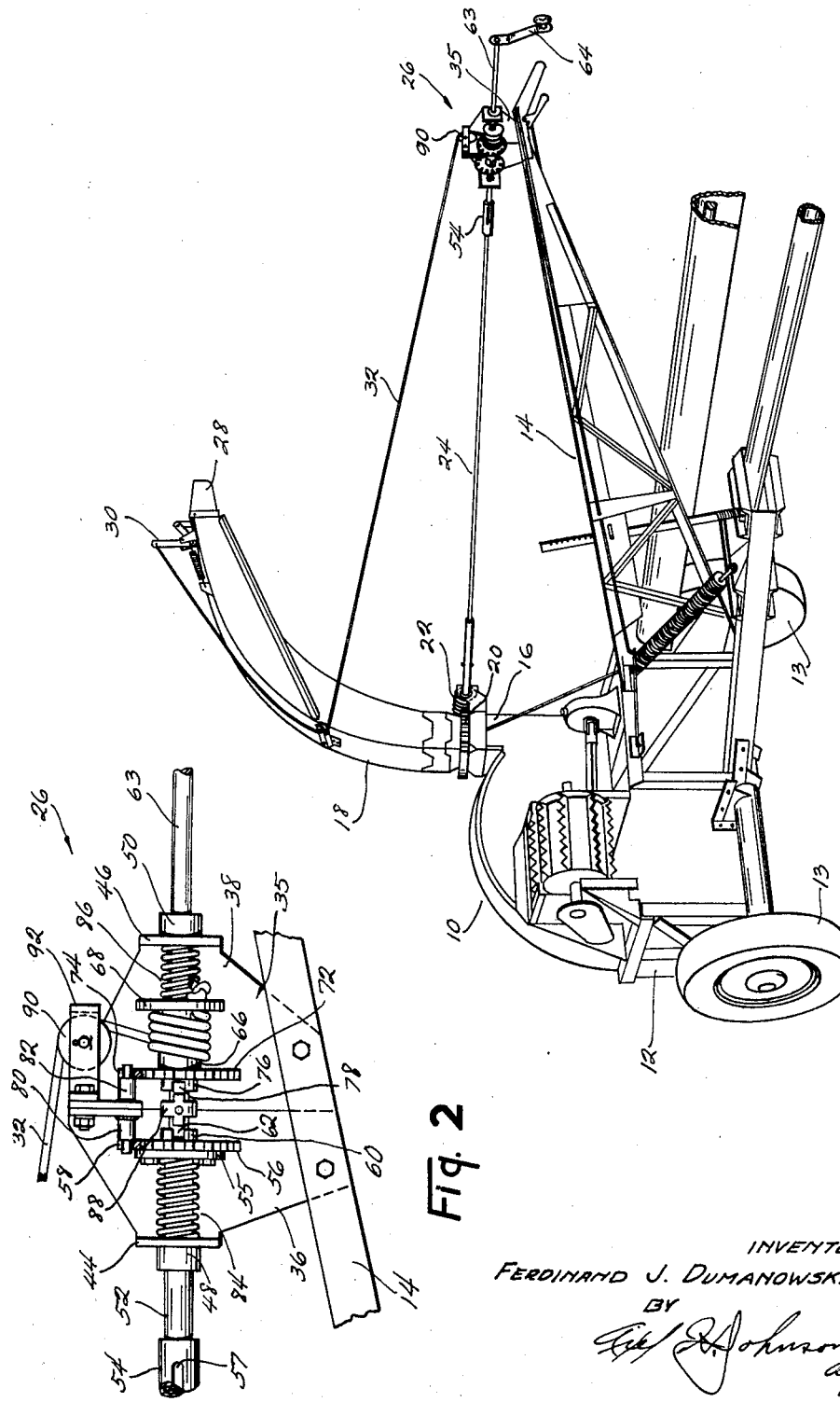
Dec. 8, 1959   F. J. DUMANOWSKI   2,916,330
DELIVERY PIPE CONTROL FOR A HARVESTER
Filed May 27, 1959                                                2 Sheets-Sheet 1
INVENTOR
FERDINAND J. DUMANOWSKI Dec. 8, 1959   F. J. DUMANOWSKI   2,916,330
DELIVERY PIPE CONTROL FOR A HARVESTER Filed May 27, 1959   2 Sheets-Sheet 2

United States Patent Office 2,916,330
Patented Dec. 8, 1959

2,916,330

DELIVERY PIPE CONTROL FOR A HARVESTER

Ferdinand J. Dumanowski, Davenport, Iowa, assignor to J. I. Case Company, Racine, Wis., a corporation of Wisconsin Application May 27, 1959, Serial No. 816,164

4 Claims. (Cl. 302—34)

This invention relates to a forage harvester and especially to a means of remotely controlling the position for the delivery pipe and spout when depositing the cut product into a wagon or truck.

Forage harvesters are usually provided with a swiveling delivery pipe for the deposit of cut crops into a wagon or a truck transported parallel to the harvester. The truck may be driven independently of the harvester or connected to a hitch which also draws the harvester. In both instances it is necessary to have control over the deposit of the crop in order to fill the wagon or truck box to a uniform depth. This control includes rotation of the delivery pipe and raising and lowering the deflector spout.

An object of this invention is to provide a dual purpose control means employing a single control member operable from the tractor set.

Further objects and advantages of this invention will become apparent from a consideration of the following detailed description taken in connection with the accompanying drawings, wherein a satisfactory embodiment of the invention is shown. However, it is to be understood that the invention is not limited to the details disclosed but includes all such variations and modifications as fall within the spirit of the invention.

Referring to the drawings, Fig. 1 is a perspective fragmentary view of a forage harvester embracing the invention.

Fig. 2 is an enlarged fragmentary view of the control unit in a neutral or locked position.

Figure 4:
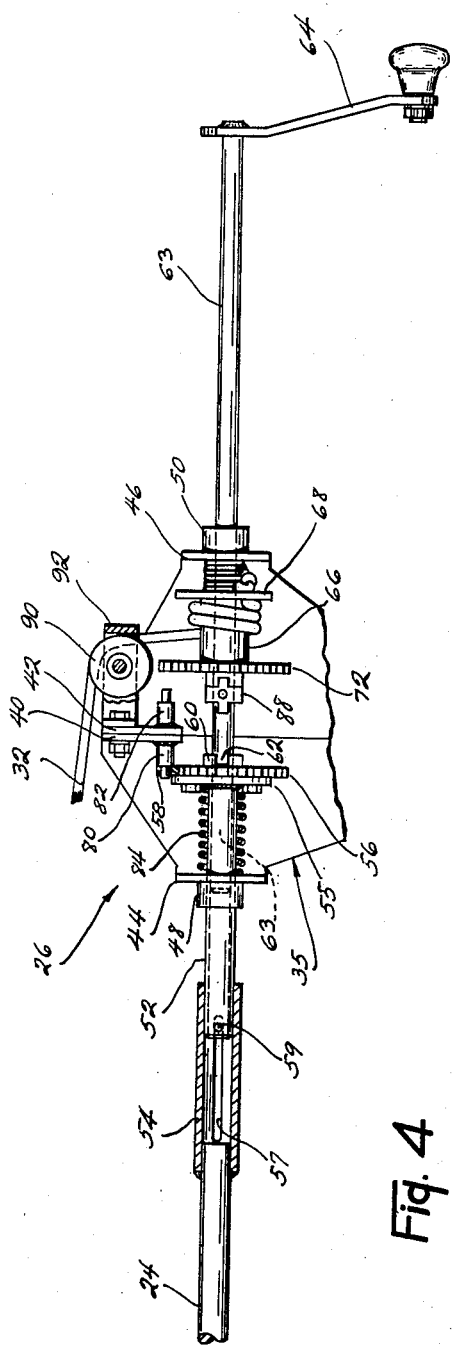
Fig. 4 is a fragmentary view of the control unit in position to raise or lower the spout.

The invention will now be described by referring to the drawings:

The harvester has a cutter housing 10 mounted on a transport frame 12, having transport wheels 13 and a forwardly-extending height control lever frame 14. Cutter housing 10 has a discharge portion 16, which opens upwardly and on which delivery pipe 18 is rotated on a vertical axis. Pipe 18, is provided with a rotating means including a worm wheel 20 on the pipe, a worm 22 journaled on portion 16, which meshes with wheel 20, and control member or shaft 24 which is secured to worm 22, and extends forwardly and engages a control means 26.

Delivery pipe 18 terminates upwardly in a deflector spout 28 which is pivoted thereon on a horizontal axis. An upright lever 30 engages spout 28, and flexible means such as a cable or rope 32 is passed through a hole in lever 30, trained about a pulley 34, and extends forwardly to above-mentioned control means 26.

Figure 3:
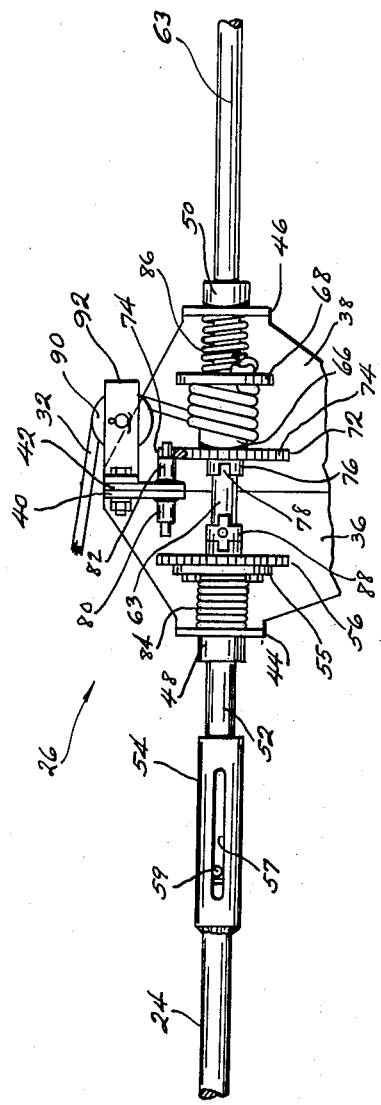
Fig. 3 is similar to Fig. 2, but with the control engaged to rotate the delivery pipe.

Referring to Figs. 2, 3, and 4, control means 26 in this instance comprises a base 35 consisting of a pair of supporting plates 36 and 38 which are secured together and to height control lever frame 14 in any suitable manner as shown. Plates 36 and 38 have flanges 40 and 42 which are in mutual contact. Plates 36 and 38 are also provided with journal-support flanges 44 and 46 in which are mounted a rear bearing member 48 and a front bearing member 50.

A tubular shaft 52 is slidably journaled in rear bearing 48, and extends rearwardly. A sleeve 54 is fixed on shaft 24 and slidably receives shaft 52. The front end of shaft 52 terminates in a flange 55 to which is fixed a plate 56 having circumferential notches or apertures 58. Plate 56 is also provided with a hub 60 having diametrically positioned engaging means such as notches 62 for a purpose to be later described.

An operating member such as a crank rod 63 having a crank 64 is slidably journaled in front bearing 50, and extends a substantial distance into tubular shaft 52. Sleeve 54 is provided with a slot 57, and a pin 59 in tubular shaft 52 compels the latter to turn with shaft 24.

A winch drum 66 is freely mounted on rod 63, and has a flange 68, to which rope 32 is affixed. A plate 72 forms the other flange of drum 66 and is provided with circumferential notches or apertures 74 and also a hub 76 having diametrically positioned notches 78. Flanges 40 and 42 support lock pins 80 and 82 which are aligned respectively with notches 58 and 74 of plates 56 and 72.

A spring 84 surrounds tubular shaft 52, and is positioned intermediate flange 44 and flange 55 and functions to normally urge locking engagement between notches 58 and lock pin 80. A spring 86 surrounds rod 63, and is positioned intermediate flange 46 and flange 68, and functions to normally urge winch drum 66 into locking engagement between notches 74 and lock pin 82. Thus plate 56, and plate 72 with winch drum 66, are locked in an inoperative position as shown in Fig. 2, thus fixing the setting of pipe 18 and spout 28.

A drive means such as a clutch collar 88 is keyed or otherwise secured to rod 63 intermediate plates 56 and 72 and has lugs that engage notches 62 and 78 when rod 63 is shifted axially.

Fig. 1 shows spout 28 pivoted for vertical swinging so as to direct the crop in a vertical plane. A lever 30 is pivoted on pipe 18, and functions to raise or lower spout 28 upon manipulation of rope 32.

Rope 32 is trained about pulley 34 as mentioned and is finally wound on drum 66. A sheave 90 journaled in a bracket 92 on flange 42 guides rope 32 as the latter is wound or unwound.

When the operator desires to rotate pipe 18, to direct the crop in a fore-and-aft direction, he grasps crank 64 and shifts it axially rearwardly thus disengaging notches 58 from locking pin 80 and engaging clutch collar 88 with notches 62. Rotation of crank 64 will then effect the rotation of shaft 24, worm 22, worm wheel 20 and therefore of pipe 18.

When the operator desires to raise or lower the spout 28, he shifts rod 63 axially forward thus disengaging plate 72 from pin 82, and engaging clutch collar 88 with notches 78. Rotation of crank 64 will then wind or unwind rope 32 relative to drum 66 and raise or lower spout 28.

When either of the above mentioned adjustments have been made, crank 64 is released and either spring 84 or 86 will return the unlocked plates 56 or 72 to the locked position. Both adjustments will then be locked against displacement.

The above being a complete description of an illustrative embodiment of the invention what is claimed as new and desired to be secured by Letters Patent of the United States is:

1. In a harvester of the type having a frame, a delivery pipe mounted for rotation on said frame, rotating means associated with said pipe, a spout pivoted on said pipe and pivoting means associated with said spout, the improvement comprising control means for operating said rotating means and said pivoting means including an operating member rotatable and axially shiftable on said frame, a first palte member having peripheral apertures and being freely rotatable on said operating member and slidably keyed to said rotating means, a second plate member having peripheral apertures and freely rotatable and axially shiftable on said operating member and having winch means, said pivoting means including a flexible member connected to said winch means, said plates being provided with engaging means on the mutually-opposed faces thereof, drive means secured to said operating member intermediate said plates for selective engagement with said engaging means upon shifting of said operating member axially, lock means on said frame intermediate said plates, and means to urge said plates toward said lock means to effect engagement of said apertures with said lock means.

2. In a harvester of the type having a frame, a delivery pipe mounted for rotation on said frame, rotating means associated with said pipe including a forwardly extending shaft, a spout pivoted on said pipe and pivoting means associated with said spout including a flexible member, the improvement comprising control means for operating said rotating means and said pivoting means including an operating member rotatable and axially shiftable on said frame, a first plate member having peripheral apertures and being freely rotatable on said operating member and slidably keyed to said shaft, a second plate member having peripheral apertures, freely rotatable and axially shiftable on said operating member and having winch means on which said flexible member is wound, said plates being provided with clutch engaging means on the mutually-opposed faces thereof, clutch means secured to said operating member at a position intermediate said plates to selectively engage said clutch engaging means upon shifting said operating member axially, lock means on said frame intermediate said plates, and resilient means arranged to urge said plates toward said lock means to effect engagement between said apertures and said lock means.

3. In a harvester of the type having a frame, a delivery pipe mounted for rotation on said frame, rotating means associated with said pipe including a forwardly-extending shaft terminating in a sleeve having a longitudinal slot, a spout pivoted on said pipe and pivoting means associated with said spout, said pivoting means including a cable means, the improvement comprising control means for operating said rotating means and said pivoting means including an operating member rotatable and axially shiftable on said frame and terminating forwardly in a crank, a first plate member having peripheral apertures and being integral with a rearwardly-extending tubular shaft and rotatably mounted on said operating member, said tubular shaft being slidable in said sleeve, a pin in said tubular shaft engaging said slot for driving relation between said tubular shaft and said sleeve, a second plate member having peripheral apertures and a winch means integral with said second plate member freely rotatable and axially shiftable on said operating member, said cable means being wound on said winch means, said plates being provided with clutch engaging apertures on the mutually-opposed faces thereof, clutch means having lugs complementary with said clutch engaging apertures and secured integrally to said operating member at a position intermediate said plates to selectively engage said clutch engaging apertures upon shifting of said operating member axially, lock means on said frame intermediate said plates, and resilient means arranged to urge said plates toward said lock means to effect engagement between said peripheral apertures and said lock means.

4. In a harvester of the type having a frame, a delivery pipe mounted for rotation on said frame, rotating means associated with said pipe including a forwardly-extending shaft terminating in a sleeve having a longitudinal slot, a spout pivoted on said pipe and pivoting means associated with said spout, said pivoting means including a cable means, the improvement comprising control means for operating said rotating means and said pivoting means including an operating member rotatable and axially shiftable in a front bearing on said frame and terminating forwardly in a crank, a first plate member having peripheral apertures and being integral with a rearwardly-extending tubular shaft rotatably mounted on said operating member, said tubular shaft journaled in a rear bearing on said frame and slidable in said sleeve, a pin in said tubular shaft engaging said slot for driving relation between said tubular shaft and said sleeve, a second plate member having peripheral apertures and a winch drum integral with said plate member and being freely rotatable and axially shiftable on said operating member, said cable means being wound on said drum, said plates being provided with clutch engaging apertures on the mutually-opposed faces thereof, clutch means having lugs complementary with said clutch engaging apertures and being secured integrally to said operating member at a position intermediate said plates to selectively engage said clutch engaging apertures upon shifting of said operating member axially, lock means on said frame intermediate said plates, and resilient means arranged to urge said plates toward said lock means to effect engagement between said peripheral apertures and said lock means.

No references cited.